US008763563B2

(12) United States Patent
Thalmann

(10) Patent No.: US 8,763,563 B2
(45) Date of Patent: Jul. 1, 2014

(54) LEASH AND COLLAR FOR ANIMAL CONTROL

(71) Applicant: Stephen David Thalmann, Camden, NY (US)

(72) Inventor: Stephen David Thalmann, Camden, NY (US)

( * ) Notice: Subject to any disclaimer, the term of this patent is extended or adjusted under 35 U.S.C. 154(b) by 0 days.

(21) Appl. No.: 13/907,505

(22) Filed: May 31, 2013

(65) Prior Publication Data

US 2013/0327280 A1    Dec. 12, 2013

Related U.S. Application Data

(60) Provisional application No. 61/689,487, filed on Jun. 7, 2012.

(51) Int. Cl.
*A01K 27/00*    (2006.01)
(52) U.S. Cl.
CPC ..................... *A01K 27/009* (2013.01)
USPC .......................... 119/859; 119/792
(58) Field of Classification Search
CPC . A01K 27/009; A01K 15/021; A01K 27/005; Y10S 119/908
USPC .................. 119/712, 719, 792, 795, 859, 858
See application file for complete search history.

(56) References Cited

U.S. PATENT DOCUMENTS

| 6,003,474 | A | * | 12/1999 | Slater et al. | 119/859 |
| 6,047,664 | A | * | 4/2000 | Lyerly | 119/719 |
| 6,053,128 | A | * | 4/2000 | McCulloch | 119/792 |
| 6,116,192 | A | * | 9/2000 | Hultine et al. | 119/719 |
| 6,748,902 | B1 | * | 6/2004 | Boesch et al. | 119/719 |
| 7,703,418 | B2 | * | 4/2010 | Henderson | 119/792 |
| 7,992,525 | B1 | * | 8/2011 | Fisher | 119/860 |
| 8,402,924 | B2 | * | 3/2013 | Pacheco et al. | 119/719 |
| 2011/0232584 | A1 | * | 9/2011 | Valencia | 119/719 |

* cited by examiner

*Primary Examiner* — Kristen C Hayes
(74) *Attorney, Agent, or Firm* — Joseph R. Carvalko

(57) ABSTRACT

A leash held at one end by a trainer and attached at the other end to a coupler which attaches to either a harness or collar secured to the body of an animal, the coupler having therein an RF transmitter that transmits a signal consisting of one or more pulsed sequences dependent on the actuation of a switch that activates upon sensing a pulling force exerted between the animal and the trainer, said magnitude of force dependent on a spring, housed within the coupler and having an associated preset tension, wherein the RF transmitted signal is received by a receiver and a transducer located in an independent correction collar that transforms the received signal to a corresponding one or more applied electrical or mechanical pulsed forces to the bodily part of the of the animal secured by the correction collar.

12 Claims, 6 Drawing Sheets

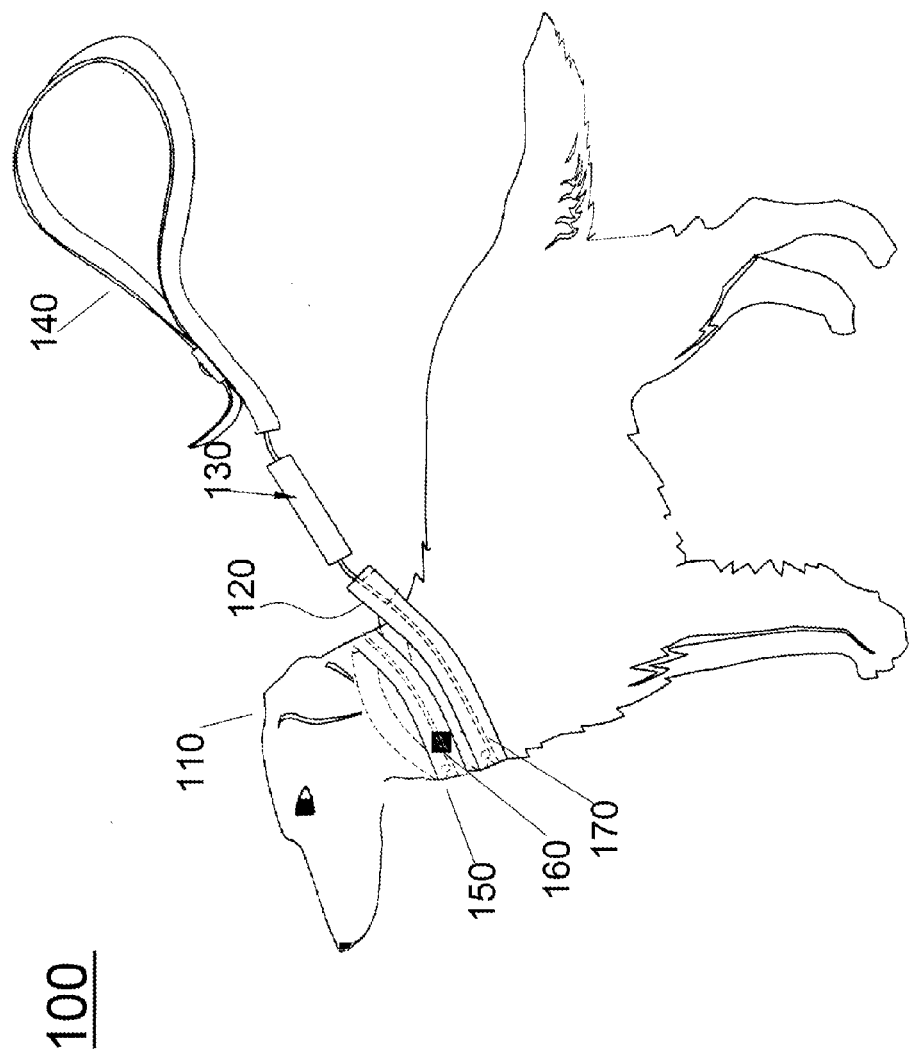

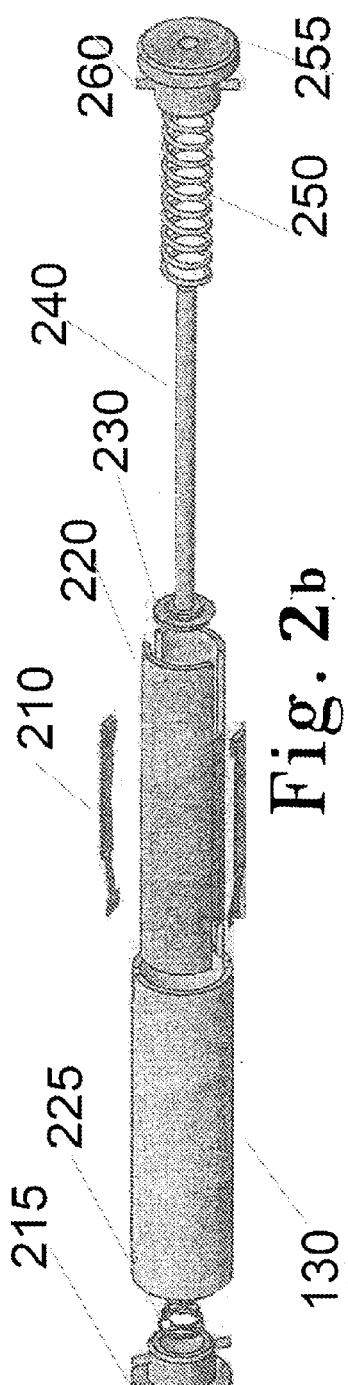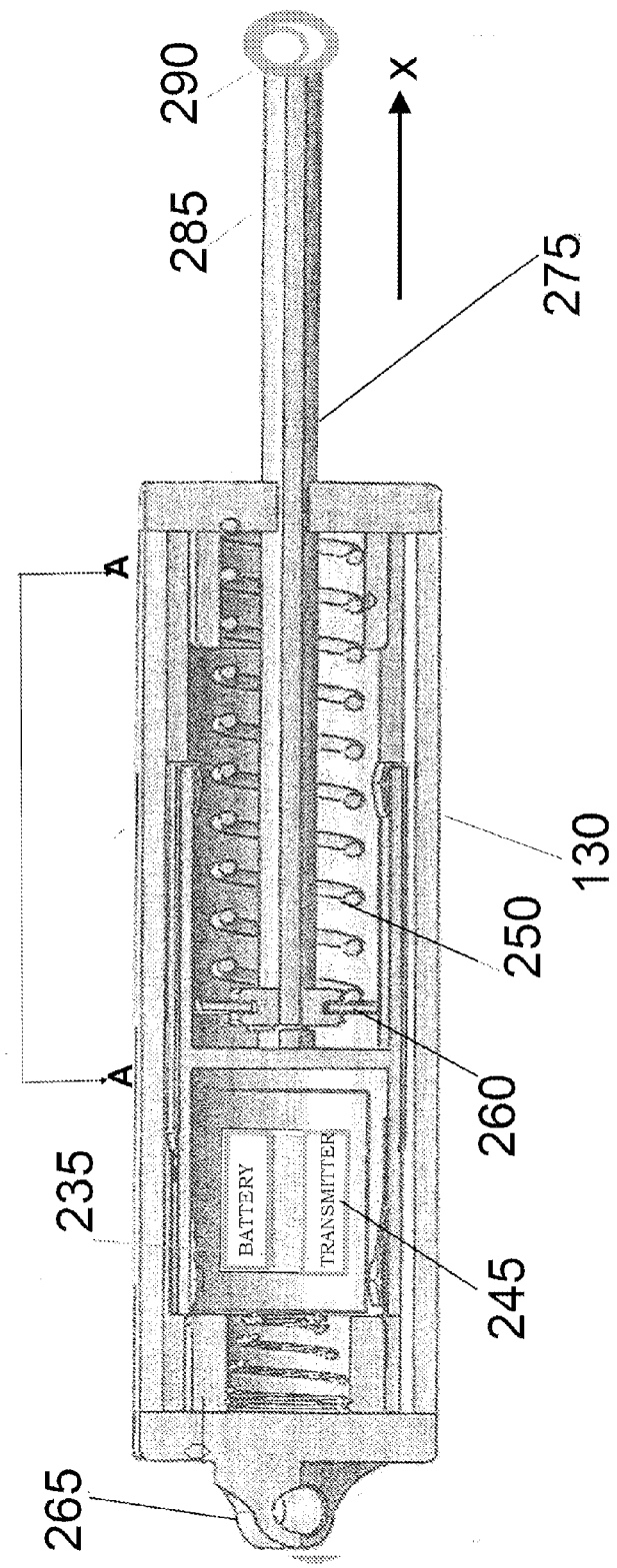
Fig. 2b
Fig. 2a

LEASH AND COLLAR FOR ANIMAL CONTROL

CROSS-REFERENCE TO RELATED APPLICATIONS

This is a non provisional patent application claiming the priority benefit under 35 U.S.C. 119 (e) of U.S. Provisional Application No. 61/689,487, E-Z walk, no-tug leash to collar coupler filed on Jun. 7, 2012, the entire disclosures of which is hereby incorporated by reference.

FIELD OF THE INVENTION

This invention relates to training devices and systems utilizing leashes controllers, transducers and collars associated therewith to transmit signals and pressures to animals attached thereto.

BACKGROUND OF THE INVENTION

Dog owners frequently complain about pets that do not conform to a normal walking routine, but tend to run and tug at the leash in every direction, which diminishes the satisfaction of walking the dog. To reform the inclination of a dog to pull and run in scattered directions, training collars activated by handheld devices have been used to produce various stimulation that provide positive reinforcement for getting the dog's attention and eventually training them to cease tugging on the leash and to adopt a comfortable, controlled pace.

Some trainers use a low level of shock as a marker to identify for the animal a behavior to be avoided. These devices exert a behavioral reinforcement when the trainer pairs a mild stimulus, such as an electrical shock, produced at the collar location. A problem with the current state-of-the-art is that collars that are actuated by the owner often do not sufficiently coincidentally produce the stimulus to the misbehavior of the pet. A more timely application of the positive reinforcement following the objectionable behavior needs to be found.

Valencia (US 2011/0232584 A1) cites a device that upon activation emits one or more noises to get the animals attention. It is a standalone device that fails to be practical for the average pet owner because it does not associate the device with the dog's standard walking collar or harness. Noise stimulation is quite different from actual bodily contact from a stimulation force.

Hultine et al (U.S. Pat. No. 6,116,192) provides an electrical impulse to the animal via a piezoelectric or mechanical sensing, but the leash is directly tied to the device that delivers the shock to the animal, thus either causing the animal to become averse to the standard collar and limiting where the trainer might want to apply the leash, as for example on harness.

Fisher (U.S. Pat. No. 7,992,525 B1) uses pressure activation as may be supplied by a lever when the dog pulls the leash that then operates a spray in the direction of the dog's nose. The means to deter the animal's behavior is fluid based, in an area where dogs learn to turn their heads in response to the spray. Additionally the device is triggered via direct physical contact with the animal.

Boesch et al (U.S. Pat. No. 6,748,902 B1) uses a handheld device having therein a transmitter that sends a signal to a correction collar when a transducer to a collar that measures the strength of pull and at differing levels of pull tension is activated. In this instance the leash is again directly connected to the collar that supplies the shock to the animal, thus either causing the animal to become averse to the standard collar and limiting where the trainer might want to apply the leash, as for example on harness.

None of the prior art teaches a leash attachable to a normal dog collar or harness that is independent of a second collar that actually supplies an electrical or mechanical stimulation simultaneously with a tugging force. Having a stimulation device independent from the walking collar or harness allows the more natural practice of pacing and casually walking a dog and a more reliable energy transfer device to the dog's body.

SUMMARY OF THE INVENTION

This invention generally relates to an animal training system which uses a leash coupled to a device that when subjected to a pulling force between an animal and a trainer activates a transmitter that sends a signal to a correction collar. In one embodiment an animal training system includes a leash held at a proximal end by a trainer, and a coupler having a first end attached to the leash and a second end attached to one of a harness or collar that is secured to the body of an animal, said coupler having therein a spring, housed within the coupler and having an associated preset tension, a switch that activates upon sensing a pulling force between the animal and the trainer that is exerted on the spring, an RF transmitter that transmits a signal consisting of one or more pulsed sequences responsive to the actuation of the switch, an independent correction collar that houses a receiver-controller, said receiver-controller responsive to said RF transmitter signal producing a corresponding one or more applied electrical or mechanical pulsed forces to the bodily part of the of the animal secured by the correction collar.

In another embodiment a leash held at a proximal end by a trainer and attached at a distal end to a coupler having a first end and the coupler having a second end attached to one of a harness or collar secured to the body of an animal, said coupler having therein an RF transmitter that transmits a signal consisting of one or more settable pulsed sequences dependent on the actuation of a switch that activates upon sensing a pulling force exerted between the animal and the trainer, said quantum of force dependent on a spring, housed within the coupler and having an associated preset tension, wherein said RF transmitted signal is received by a receiver and a controller located in an independent correction collar that transforms said received signal to a corresponding one or more applied electrical or mechanical pulsed forces to the bodily part of the of the animal secured by the correction collar.

This invention also relates to a method for training an animal including the steps of employing a leash coupled to a device that when subjected to a pulling force between the animal and a trainer activates a transmitter that sends a signal to a correction collar. In one embodiment the method includes the steps of: holding a proximal end of a leash and attaching the distal end of the leash to a first end of a coupler having two ends and an RF transmitter contained therein, and attaching a second end of the coupler to one of a harness or collar, and securing said one of a harness or collar to the body of the animal, presetting a tension on a spring located within the coupler, actuating a switch dependent on substantially matching the preset tension on the spring to the tension between the animal and the trainer exerted on the spring, transmitting one or more pulsed sequences from an RF transmitter in response to the actuation of the switch, receiving said RF transmitted signal by a receiver located in a correction collar, transforming said received signal to a corresponding one or more electrical or mechanical energy pulses, applying the energy pulse to the bodily part of the of the animal secured by the correction collar.

BRIEF DESCRIPTION OF THE DRAWINGS

FIG. 1 is a plan view illustrating the invention and elements in accordance with an embodiment of the invention.

FIG. 2a shows the coupler and the spring mechanism in accordance with an embodiment of the invention FIG. 2b shows the coupler and the spring mechanism in accordance with an embodiment of the invention.

DETAILED DESCRIPTION OF THE INVENTION

Figure 2D:
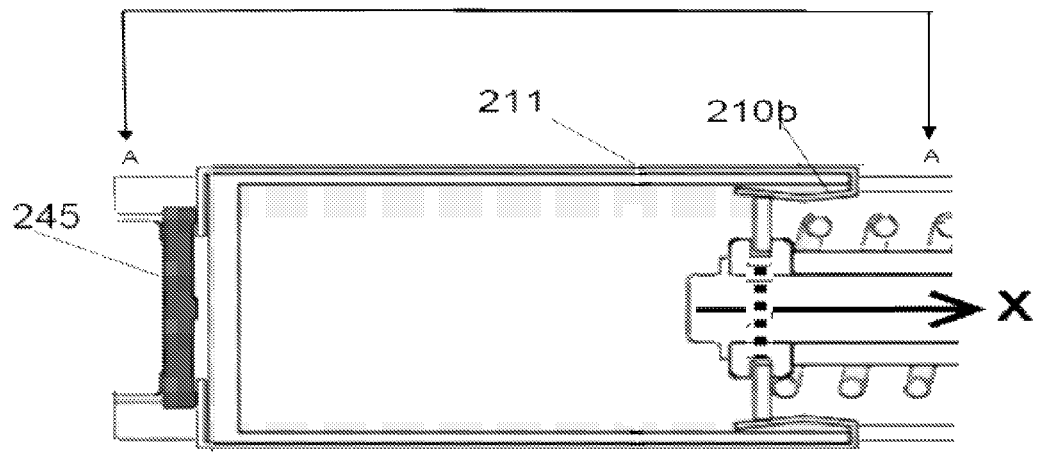
FIG. 2d shows a section of the coupler and a switch mechanism in accordance with an embodiment of the invention.

The following detailed description includes the best mode of carrying out the invention and is made for the purpose of illustrating the general principles of the invention and should not be taken in a limiting sense. The scope of the invention is determined by reference to the claims. Each part or function is assigned, even if structurally identical to another part, a unique reference number wherever that part is shown in the drawing figures.

In the preferred embodiment, FIG. 1 shows the invention disclosed herein as it relates to an animal training system 100, which uses a leash 140 attached to a substantially rigid plastic or metal coupler device 130, which it turn is attached to a collar 170. When the coupler device 130 is subjected to a pulling force between an animal 110 and a trainer, a preset activation force triggers a transmitter that sends a signal to an independent correction collar 150. In another embodiment (not shown), it will be recognized that the coupler 130 may connect to a harness (not shown) rather than the collar 170, in which case the harness would be subjected to a pulling force between an animal 110 and a trainer, thus activating the transmitter to send a signal to the independent correction collar 150. In yet another embodiment the mechanism and therefore function of the independent correction collar 150 to apply stimulation to the animal in the vicinity of the neck may be imbedded in an independent correction harness (not shown) such that the mechanism applies stimulation to the torso area of the animal. In this embodiment the coupler 130 would connect to the collar 170 as shown in FIG. 1.

Referring to FIG. 1, FIG. 2a and FIG. 2b, the animal training system 100 includes the leash 140 held at a proximal end by a trainer. The leash 140 is attached to coupler 130 having a first end 265. The coupler 130 second end 290 attaches to one of a harness or collar 170 secured to the body of an animal. The coupler 130 contains a spring 250 that expands and contracts against an end cap 255 depending on the tug of the animal. The coupler 130 exerts an associated adjustable preset tension established by a slideably movable biasing stop 260 to shorten the length the spring 250. When the spring 250 compresses as a result of a tug by the animal in the direction of X, conductive activation washer 230 compresses the switch 210 that turns on RF transmitter 245, which transmits a signal consisting of one or more pulsed sequences responsive to the actuation of the switch 210 closure. Battery 235 powers the transmitter, the battery and transmitter held in place by a spring 225 and end cap 215. The animal learns to avoid the unwanted behavior through a technique of applying a stimulation when the aversive behavior exists i.e., pulling on the leash beyond a preset force.

Figure 2C:
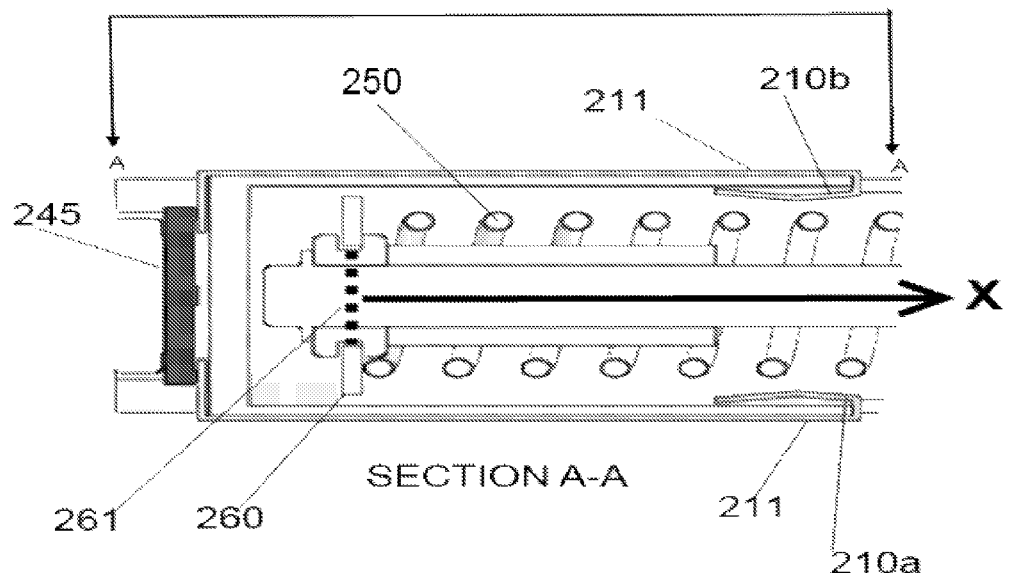
FIG. 2c shows a section of the coupler and a switch mechanism in accordance with an embodiment of the invention.

By way of further explanation, FIG. 2a, FIG. 2c and FIG. 2d, shows an embodiment of the switch mechanism that enables the transmitter upon a preset spring pressure being met by moving biasing stop 260 slideable in the direction X, thus shortening the length the spring 250. The stop 260 is attached to a conductive member 261 such as a washer, making the stop a conductive bar, which completes an electrical circuit between the switch contacts 210a, 210b that causes current to flow in wire 211 and turns on battery power to the RF transmitter 245. The independent correction collar 150 that houses a receiver-transducer 160 is responsive to the RF transmitter signal producing a corresponding one or more applied electrical or mechanical pulsed forces to the bodily part of the of the animal 110.

Figure 3:
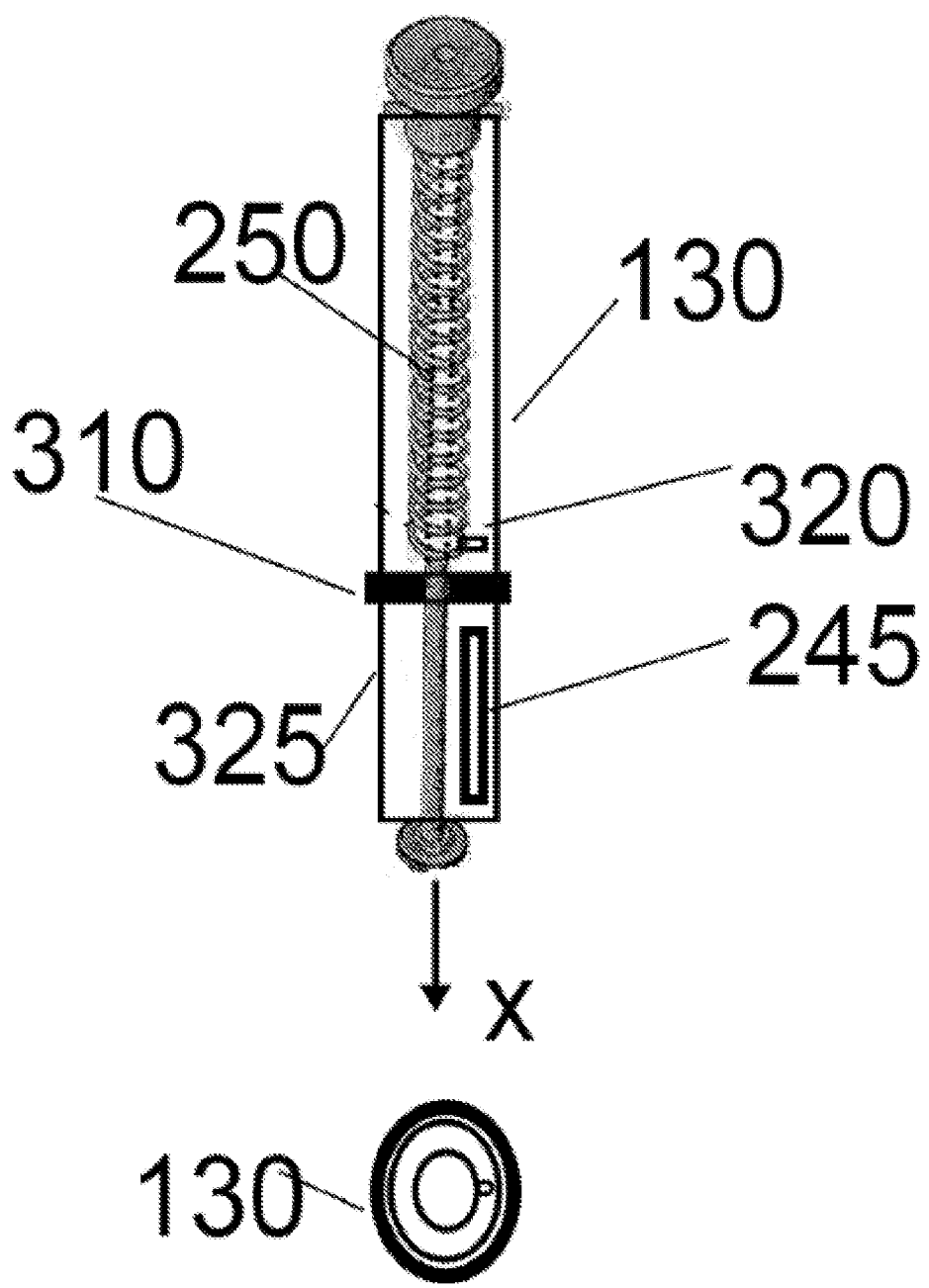
FIG. 3 is shows a sensing mechanism in accordance with an alternate embodiment of the invention.

Referring to FIG. 3 an alternate embodiment shows the coupler 130 contained in a flexible member, such as by way of example and not limitation a clear transparent polyvinylchloride sleeve or tube 325 having a first end and having a second end attached to one of a harness or collar secured to the body of an animal. In this configuration the spring 250 has affixed to its free end 330 a light detector 320, such as a silicon cell or a cadmium light detector by way for example and not limitation. Affixed to the sleeve 325 is an adjustable opaque ring 310 that moves collinear with the cylindrical body of the sleeve 325. When the light detector 320 moves into the inner location of the ring 310, the lack or reduction in ambient light causes a lowered current level generated by the light detector 320 to switch on the transmitter 245. It will be obvious to one with ordinary skill in the art of photoelectric switching the circuit and components needed to implement foregoing actuation of the RF transmitter 245 dependent on the occurrence of an interruption of light utilizing light sensing devices such as the light detector 320.

Figure 4:
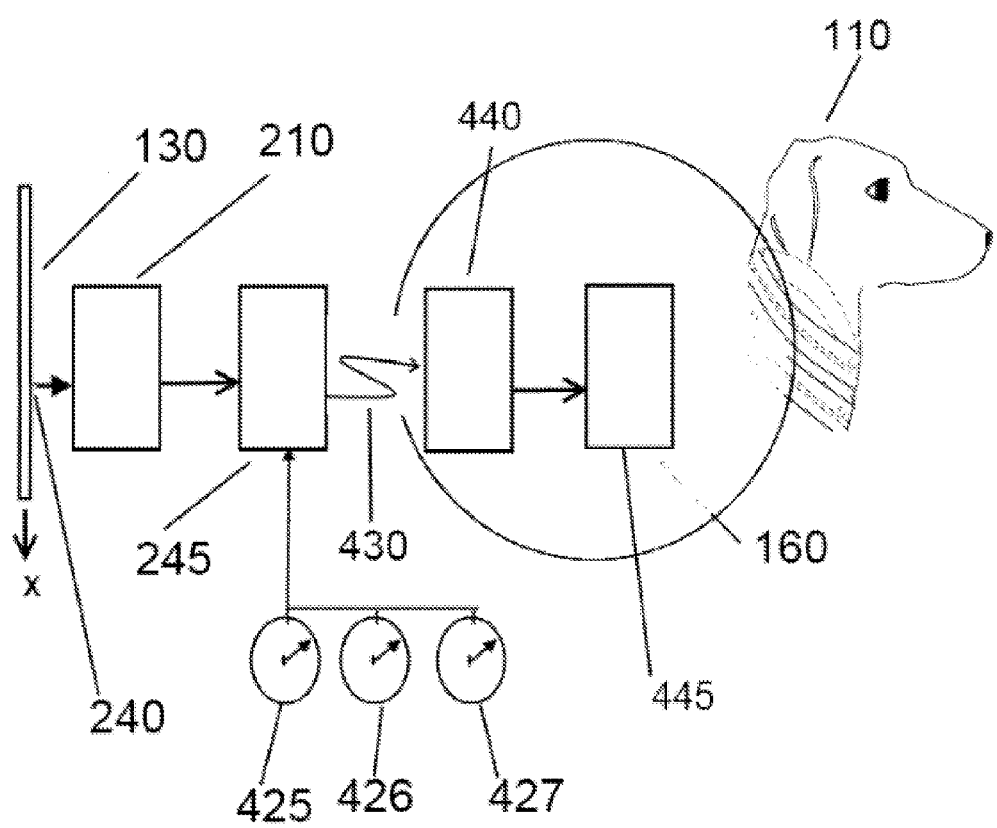
FIG. 4 is a block diagram of an electronic system for a leash with a force sensing mechanism between the animal and a trainer in accordance with an embodiment of the invention.

FIG. 4 is a block diagram of the electrical components that generate the energy that controls the animal's behavior. The coupler 130 contains the spring 250 that establishes the trigger point that actuates the switch contact 210 that in turn energizes the RF transmitter 245. In the embodiment illustrated the user may adjust the pulse frequency, pulse duration and amplitude of the pulse on the receiving end through a s pulse frequency control device 425, pulse duration control device 426 and amplitude control device 427. The RF transmitted signal 430 received by the receiver-transducer 160, located in the correction collar 150, will compute the required parameters in the receiver/computer 440 portion of receiver-transducer 160 for applying the adjusted pulse frequency, pulse duration and amplitude based on the received signal in converting it into a corresponding one or more electrical or mechanical energy pulses supplied by the transducer 445 portion of the receiver-transducer 160. It will be obvious to one with ordinary skill in the art of telemetry to implement foregoing adjusted pulse frequency, pulse duration and amplitude based on the received signal.

Figure 5:
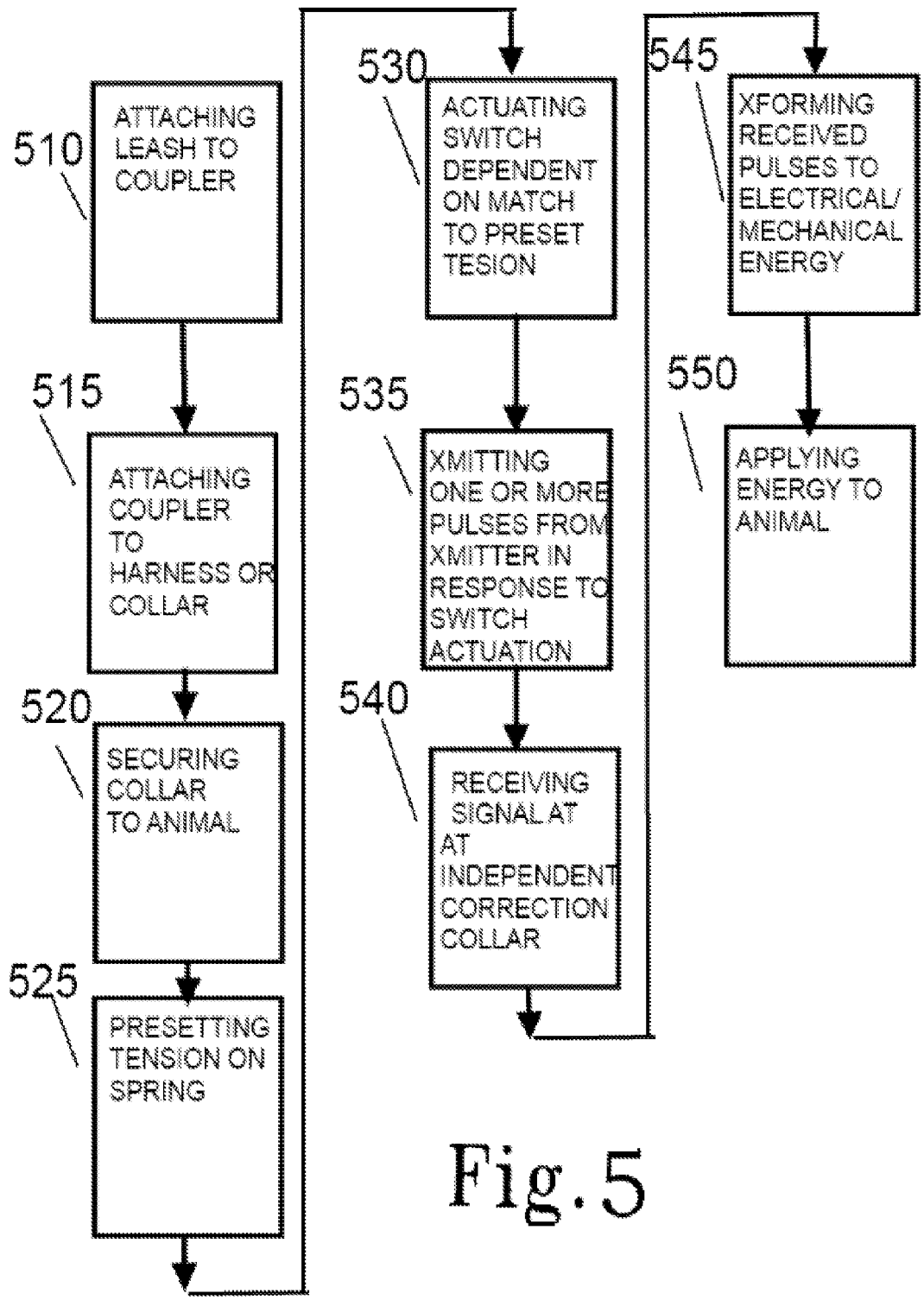
FIG. 5 is a flow chart of a method of employing a leash with a force sensing mechanism between the animal and a trainer in accordance with an embodiment of the invention.

As shown in flow chare FIG. 5, this invention also relates to a method for training the animal 110 including the steps of: attaching 510 the distal end of the leash to a first end of a coupler 130 having two ends and an RF transmitter contained therein, and attaching 515 a second end of the coupler 130 to one of a harness or collar 170, and securing 520 one of a harness or collar 170 to the body of the animal 110, presetting 525 a tension on the spring 250 located within the coupler 130, actuating 530 the switch 210 dependent on substantially matching the preset tension on the spring 250 to the tension between the animal 110 and the trainer exerted on the spring 250, transmitting 535 one or more pulsed sequences from an RF transmitter 245 in response to the actuation of the switch 210, receiving 540 said RF transmitted signal by the receiver-transducer 160 located in the independent correction collar 150, transforming 545 said received signal to a corresponding one or more electrical or mechanical energy pulses, applying 550 the energy pulse to the bodily part of the of the animal 110 secured by the correction collar 150.

While the foregoing invention has been described with reference to the above embodiments, additional modifications and changes can be made without departing from the spirit of the invention. Accordingly, such modifications and changes are considered to be within the scope of the appended claims.

I claim:

1. An animal training system comprising,
a leash and
a coupler having a first end attached to the leash, and
one of a harness or collar secured to the body of an animal and attached to a second end of the coupler, said coupler having therein:
  a spring, housed within the coupler and having an associated preset tension,
  a switch that activates upon sensing a pulling force between the animal and the trainer exerted on the spring,
  an RF transmitter that transmits a signal consisting of one or more pulsed sequences responsive to the actuation of the switch,
a correction device comprising one of a correction collar or correction harness, said correction device independent from said harness or collar, wherein said correction device includes a receiver-controller,
  said receiver-controller responsive to said RF transmitter signal for producing a corresponding one or more applied electrical or mechanical pulsed forces to the bodily part of the of the animal secured by the correction device.

2. The animal training system in claim 1, wherein the switch that activates upon sensing a pulling force between the animal is a mechanical switch.

3. The animal training system in claim 1, wherein the switch that activates upon sensing a pulling force between the animal is a photoelectric switch.

4. The animal training system in claim 1, wherein a stop sets a preset tension in the spring that when met by a pulling force on the spring actuates a switch having a conductive bar that completes an electrical circuit between switch contacts causing current to flow to the RF transmitter.

5. The animal training system in claim 1, wherein transmitting one or more pulsed sequences from said RF transmitter includes one or more devices that adjust the pulse frequency, pulse duration and pulse amplitude on the receiving end.

6. The animal training system in claim 1, wherein the coupler is a constructed from a substantially rigid plastic.

7. The animal training system in claim 1, wherein the coupler is a constructed from a flexible member.

8. The animal training system in claim 7, wherein the flexible member is a polyvinylchloride tube.

9. The animal training system in claim 1, wherein the coupler attaches to a harness.

10. The animal training system in claim 1, wherein the correction harness transforms said received signal to a corresponding one of applied electrical currents or mechanical forces to the bodily part of the of the animal secured by the correction harness.

11. A method for training an animal comprising the steps of:
attaching the distal end of a leash to a first end of a coupler having two ends and an RF transmitter contained therein, and
attaching a second end of the coupler to one of a harness or collar, and
securing said one of a harness or collar to the body of the animal,
presetting a tension on a spring located within the coupler,
actuating a switch dependent on substantially matching the preset tension on the spring to the tension between the animal and the trainer exerted on the spring,
transmitting one or more pulsed sequences from said RF transmitter in response to the actuation of the switch,
receiving said RF transmitted signal by a receiver located in a correction device comprising one of a correction collar or correction harness, said correction device independent from said harness or collar,
transforming said received signal to a corresponding one or more electrical or mechanical energy pulses,
applying the energy pulse to the bodily part of the of the animal secured by the correction device.

12. An animal training system comprising, a leash attached to one of a harness or collar secured to the body of an animal, an RF transmitter embedded in the leash that transmits a signal dependent on the actuation of a switch that activates upon sensing a preset pulling force on the leash exerted between the animal and the trainer, wherein said RF transmitted signal is received by a receiver and a controller located in a correction device comprising one of a correction collar or correction harness, said correction device independent from said harness or collar, wherein said correction device transforms said received signal to a corresponding one of applied electrical currents or mechanical forces to the bodily part of the of the animal secured by the correction collar.

* * * * *